United States Patent
Cholley

(10) Patent No.: US 10,451,240 B2
(45) Date of Patent: Oct. 22, 2019

(54) ROTARY LIGHTING MODULE

(71) Applicant: VALEO VISION, Bobigny (FR)

(72) Inventor: Benoit Cholley, Angers (FR)

(73) Assignee: VALEO VISION, Bobigny (FR)

(*) Notice: Subject to any disclaimer, the term of this patent is extended or adjusted under 35 U.S.C. 154(b) by 209 days.

(21) Appl. No.: 15/581,856

(22) Filed: Apr. 28, 2017

(65) Prior Publication Data

US 2017/0314756 A1  Nov. 2, 2017

(30) Foreign Application Priority Data

Apr. 28, 2016 (FR) ...................... 16 53835

(51) Int. Cl.
*F21S 8/00* (2006.01)
*B60Q 1/04* (2006.01)
*F21S 41/39* (2018.01)
*F21S 41/147* (2018.01)
*F21S 41/32* (2018.01)
*F21S 41/675* (2018.01)
*F21S 43/14* (2018.01)
*F21S 43/31* (2018.01)
*B60Q 1/00* (2006.01)
*B60Q 1/115* (2006.01)
*B60Q 1/12* (2006.01)
*F21W 102/18* (2018.01)

(52) U.S. Cl.
CPC ............ *F21S 41/39* (2018.01); *B60Q 1/0041* (2013.01); *B60Q 1/115* (2013.01); *B60Q 1/122* (2013.01); *F21S 41/147* (2018.01); *F21S 41/32* (2018.01); *F21S 41/675* (2018.01); *F21S 43/14* (2018.01); *F21S 43/31* (2018.01); *B60Q 2200/36* (2013.01); *B60Q 2300/334* (2013.01); *F21W 2102/18* (2018.01)

(58) Field of Classification Search
CPC .. F21S 8/10; F21S 41/147; F21S 43/14; F21S 48/1757; F21S 48/234; B60Q 1/115; B60Q 1/121; B60Q 1/122
See application file for complete search history.

(56) References Cited

U.S. PATENT DOCUMENTS 8,096,687 B2 * 1/2012 Tajima .................. B60Q 1/076
362/465
2007/0082577 A1 * 4/2007 Tajima .................. B60Q 1/076
445/66

FOREIGN PATENT DOCUMENTS

WO  WO 2012/098142 A1  7/2012
WO  WO 2015/107273 A1  7/2015
WO  WO 2016/020600 A1  2/2016

OTHER PUBLICATIONS

French Preliminary Search Report dated Nov. 16, 2016 in French Application 16 53835 filed on Apr. 28, 2016 (with English Translation of Categories of Cited Documents).

* cited by examiner

*Primary Examiner* — Karabi Guharay
(74) *Attorney, Agent, or Firm* — Oblon, McClelland, Maier & Neustadt, L.L.P.

(57) ABSTRACT

A lighting module for a motor vehicle including at least one light source designed to emit light rays, optical deviation elements mounted movably in rotation about a first axis of rotation and arranged so as to deviate the light rays to form a light beam, and an actuator designed to rotate the optical element. According to the invention, the module is also designed to be movable in rotation about a second of rotation.

14 Claims, 3 Drawing Sheets

ROTARY LIGHTING MODULE

BACKGROUND OF THE INVENTION

Field of the Invention

The invention relates to the domain of lighting and/or signaling, in particular for a motor vehicle. More specifically, the invention relates to a lighting module for a motor vehicle, as well as a lighting and/or signaling device including such a lighting module.

Description of the Related Art

Lighting and/or signaling devices may include one or more lighting modules mounted rotatably about an axis, notably to address the problems of cornering lights. Notably, document EP 295 74 64 describes a lighting and/or signaling device for a motor vehicle that includes a housing and an assembly of at least two lighting modules, in which at least one portion of each lighting module is mounted movably in rotation about an axis under the effect of an actuator designed to transversely move the corresponding light beam coming from the lighting module. A related control device is designed to provide specific lighting command instructions differently for each lighting module as a function of traffic conditions.

Such rotary modules are particularly suited to performing directional lighting functions, better known as dynamic bending light (DBL), in which the objective is to dynamically illuminate the bend when the vehicle is turning. Since the lighting module is mounted pivotingly about a substantially vertical axis of rotation, the beam projected from the headlamp can be oriented towards the inside of a bend when cornering, instead of along the longitudinal axis of the vehicle.

BRIEF SUMMARY OF THE INVENTION

The present invention concerns the multiplication of lighting functions provided to users, in addition to the directional lighting function described above. Naturally, it is beneficial for the multiplication of such functions to be accompanied by design work to reduce the number of modules in a headlamp, in order to optimize size and/or reduce the number of components in each such module.

The invention relates to a lighting and/or signaling device for a motor vehicle, containing at least one specific lighting module.

More specifically, the invention relates to a lighting module for a motor vehicle including at least one light source designed to emit light rays, optical deviation elements mounted movably in rotation about a first axis of rotation and arranged so as to deviate said light rays to form a light beam, and an actuator designed to rotate the optical element.

According to the invention, the lighting module is also designed to be movable in rotation about a second axis of rotation substantially perpendicular to the first axis of rotation.

Thus, a single lighting module can be used to manage the BDL directional lighting function to light the inside of bends by moving transversely either leftwards or rightwards the global light beam outputted, as well as to adjust the orientation of the global light beam emitted by enabling the vertical movement of the global light beam, either upwards or downwards. When the vehicle is traveling at high speed, this latter case may facilitate early recognition of road signs positioned overhead on roads such as motorways, or to increase or decrease the range of the lights as a function of the load of the vehicle affecting the overall incline of same.

Furthermore, the invention has at least one of the following features, implemented individually or in combination with other features:
- the first and second axes of rotation are substantially perpendicular to one another,
- the elements used to guide rotation about the first axis of rotation are arranged between the optical deviation elements and the support,
- the actuator includes an output shaft extending along the first axis of rotation and carrying the optical deviation elements,
- the output shaft and the rotational guide elements are arranged on either side of the optical deviation elements along the first axis of rotation,
- the optical deviation elements comprise a substantially elliptical reflector, the light source being arranged substantially in the vicinity of a first focus of said reflector,
- at least one lighting module is associated with its own connecting rod, which is rigidly connected firstly to the actuator and, at a second opposite extremity, to a support overlapping the optical deviation elements of the related lighting module,
- the support carries the light source associated with the lighting module,
- the second axis of rotation is formed at least partially by an element carried by the support,
- the second axis of rotation is defined at least partially by two projections projecting from the support, designed to cooperate with bearings; each projection may be a cylindrical pin, oriented so as to help define along the second axis of rotation,
- the module is rotated about the second axis of rotation by an actuation element designed to push the connecting rod,
- the actuation element is designed to push on a first end of the connecting rod opposite the end of the connecting rod that is rigidly connected to the support containing the second axis of rotation,
- the actuation element includes a board carrying attachment means that are designed to cooperate with attachment means carried on the connecting rod.

The invention also relates to a lighting and/or signaling device for a motor vehicle, including at least one lighting module as described above.

Notably, the device may include a housing and a closing outer lens delimiting a seat for the at least one lighting module. This lighting module may be associated with at least one plate rigidly connected to the housing and having bearings used to define the second axis of rotation. The light beam projected from the lighting module is designed to pass through this closing outer lens before being projected onto the road in front of the vehicle.

The device may include an assembly of at least two lighting modules, each participating in the formation of a light beam, the aggregation of light beams forming a global light beam at the output of the device, notably in compliance with motor vehicle lighting and/or signaling regulations.

In each of the cases described above, the second axis of rotation may be specific to each lighting module.

BRIEF DESCRIPTION OF THE SEVERAL VIEWS OF THE DRAWINGS

Other features and advantages of the present invention are explained more clearly in the description and the drawings, in which.

DETAILED DESCRIPTION OF THE INVENTION

The description below uses, without limitation, a longitudinal, vertical and transverse orientation conventionally applied to motor cars. Furthermore, the terms lower and upper should be understood with the object in the normal usage position.

Figure 1:
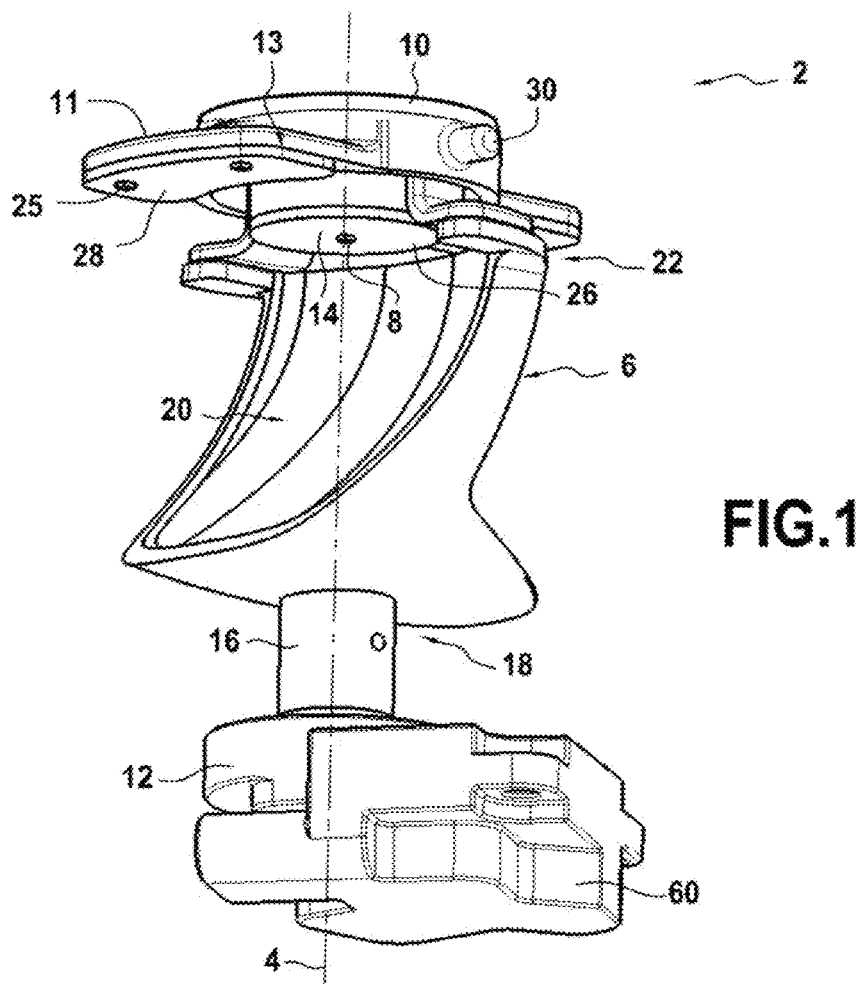
FIG. 1 is a three-quarter perspective front view of a lighting module.
Figure 2:
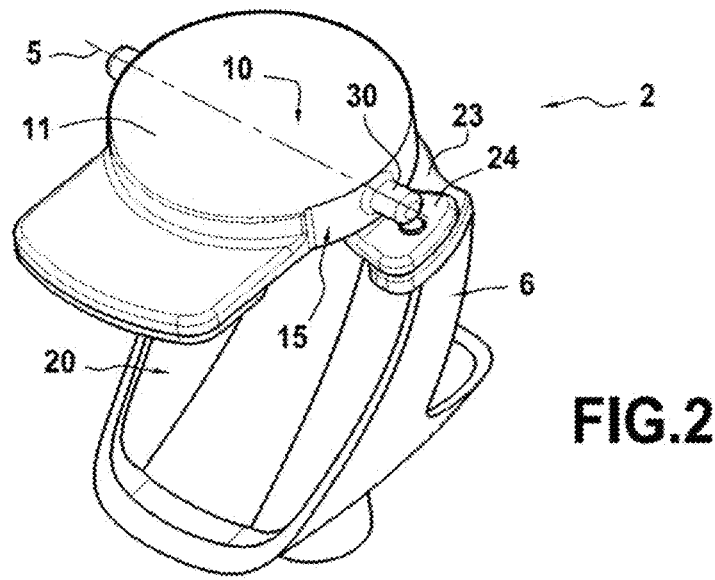
FIG. 2 is a perspective top view of the lighting module in FIG. 1.

A lighting and/or signaling device 1 according to the invention includes at least one lighting module 2 designed to move the light beam coming out of the module in two directions, notably substantially transversely about a first axis of rotation 4 and substantially vertically about a second axis of rotation 5, an exemplary embodiment of which is shown in FIGS. 1 and 2.

The lighting module 2 includes optical deviation elements 6 for the rays emitted by a light source 8 carried by a support 10. The optical deviation elements 6 are arranged about the first axis of rotation 4 and are driven in rotation by an actuator 12 about the first axis of rotation 4 to transversely move a corresponding light beam outputted from the lighting module 2.

The optical deviation elements 6 cooperate with the support 10 overlapping the lighting module 2, in particular by means of rotational guide elements (not shown here). The support 10 has a first face, referred to as the upper face 11, and a second face, referred to as the lower face 13, the lower face and the upper face being linked axially at the periphery of same by a lateral face 15.

The support 10 firstly carries the light source 8, which emits rays towards the optical deviation elements 6, and secondly carries a portion of the rotational guide elements 14 for the optical deviation elements 6 about the first axis of rotation 4. The optical deviation elements 6, which are described in greater detail below, are positioned between the guide elements and the actuator 12 relative to the arrangement of same along the first axis of rotation 4.

Control means (not shown here) control the actuator 12. A movement is transmitted by this actuator 12 to an output shaft 16, which transmits the commanded rotational movement about the first axis of rotation 4 to the optical deviation elements 6. As shown, the output shaft 16 is rigidly connected to the optical deviation elements 6 at a first end 18, in this case deemed to be the lower end in consideration of the orientation defined above.

In this case, the optical deviation elements 6 comprise an elliptical or parabolic reflector with a reflective face 20 designed to reflect the light rays emitted by the light source 8, which is substantially positioned in the vicinity of a first focus of the optical deviation elements 6. A light beam is thus generated to form a light beam that is compliant with motor vehicle lighting and/or signaling regulations.

Without departing from the context of the invention, the optical deviation elements 6 may have different shapes provided they are driven in rotation by an actuator 12 at a first end in relation to the first axis of rotation 4, and the arrangement of same in relation to the light source enables formation of a regulation-compliant beam.

In the vicinity of a second end 22 of the optical deviation elements 6, in this case referred to as the upper end in consideration of the orientation described above, i.e. the end opposite the first end 18 where the actuator 12 extends, there are upper rotational guide elements 14, by means of which the optical deviation elements 6 cooperate with the support 10.

Notably in order to enable a portion of these rotational guide elements 14 to be attached to the optical deviation elements 6, the second end 22 has an edge 23 that forms, at the periphery of the reflective face 20, a bearing surface for this portion of the rotational guide elements 14.

The arrangement of the rotational guide elements 14 and of the drive means formed by the actuator 12 and the output shaft 16, on either side of the optical deviation elements 6, enables optimal rotational guidance of the optical deviation elements about the axis of rotation.

Naturally, this guidance in rotation about the first axis of rotation 4 is important in the context of the invention, where the module is pivoted about a second axis of rotation substantially perpendicular to the first axis of rotation, which requires great precision in the positioning of the module. However, if the module is precisely driven in rotation about the first axis merely through cooperation of the drive means, the upper rotational guide elements 14 may be omitted without thereby departing from the context of the invention.

The rotational guide elements 14 and the output shaft 16 enable the optical deviation elements 6 to rotate up to 360° about the first axis of rotation 4, which is substantially vertical, without any force on the actuator 12, and with a high degree of precision in the relative positioning of the optical deviation elements 6 and of the light source 8, which is advantageously centered on the first axis of rotation 4.

The upper rotational guide elements 14 may be formed by one or more intermediate parts arranged between the support and the optical deviation elements, and they may notably be formed in two portions comprising a first portion rigidly connected to the support 10 and a second portion rigidly connected to the optical deviation elements 6, as shown in FIGS. 1 and 2. By way of example, the guide elements may comprise a rotor rigidly connected to the optical deviation elements, notably by attaching axial arms 24 extending the rotor and cooperating with the edge 23 arranged at the periphery of the reflective face 20, and a stator rigidly connected to the support 10, about which the rotor turns. The shape of the upper rotational guide elements 14 may be changed without adversely affecting the guide function about the first axis of rotation and the rotational guide elements may notably be constructed without any intermediate parts, by cooperation of an annular journal projecting from the support used as guide paths for cylindrical pins extending axially, i e. substantially parallel to the first axis of rotation, from the edge 23 arranged at the periphery of the reflective face 20.

As described above, the lighting module 2, and more specifically the support 10, carries at least one light source 8, although same may carry a plurality of light sources including one light source S and an additional light source 25, which may be semi-conductor light-emitting-diode sources.

The light source 8 is substantially aligned on the first axis of rotation 4. The expression "substantially aligned" means that the distance between the geometric center of the light source, such as a light-emitting diode, and the first axis of rotation 4 of the lighting module 2 is not greater than the dimensions of the light-emitting diode. This latter may be attached and positioned on the first face, or lower face, 13 of the support 10, in this case covered by a first printed circuit board 26.

The additional light source or sources 25 are located around the periphery of the light source 8. These latter may be attached and positioned on a second printed circuit board 28, which is itself attached to the lower face 13 of the support 10 oriented towards the optical deviation elements 6, as shown in FIG. 1.

In the lighting module 2, these light sources perform different lighting and/or signaling functions, and notably the main light source participates in performing low-beam or high-beam lighting functions, while the additional light sources participate in signaling functions using screens, as described below. The main light source is notably designed such that the light rays emitted from same are oriented towards the optical deviation elements 6.

The means associated with performance of a rotation function about the second axis of rotation 5, which is substantially perpendicular to the first axis of rotation 4, are described below, notably with reference to FIGS. 3 and 4.

The support 10 carries projections 30, projecting from the peripheral lateral face 15 of same, that are diametrically opposed and aligned so as to determine, by cooperating with the bearings 32 (shown in FIG. 3) as described below, the orientation of the second axis of rotation 5. In the example shown, the projections 30 are each a cylindrical pin, but may be of any other shape enabling cooperation with the bearing 32, for example spherical.

These projections 30 are in this case designed to participate in the formation of a second axis of rotation 5 that is distinct from the first axis of rotation 4 about which the optical deviation elements are designed to turn via the actuator 12 and the rotational guide elements.

These projections are designed to cooperate with the coaxial bearings carried a structural part attached to the housing of the lighting and/or signaling device, as described in greater detail below. Each bearing has a groove into which is inserted the projection 30, which may be a pin or a pad, of the support 10. The cooperation between the bearings and the projections determines the second axis of rotation 5 for the lighting module 2. Axial operational clearance in the direction of the first axis of rotation 4 firstly enables rotation without friction, beneath the plate, of the module about the first axis of rotation, and enables a tilting of the module beneath the plate in rotation about the second axis of rotation. The structural part and the bearings carried by same are described in greater detail below in the description of the lighting and/or signaling device.

In a given arrangement, the first axis of rotation 4 is substantially vertical and enables the transverse rotation (in the left-right and the right-left direction) of the light beam coming out of the corresponding lighting module 2, inside the lighting and/or signaling device. The second axis of rotation 5 is substantially horizontal and enables the vertical movement (in the up-down and the down-up direction) of the light beam outputted from the corresponding lighting module 2, inside the lighting and/or signaling device. These two axes of rotation 4 and 5 are distinct and not parallel, and are advantageously perpendicular to one another.

Figure 3:
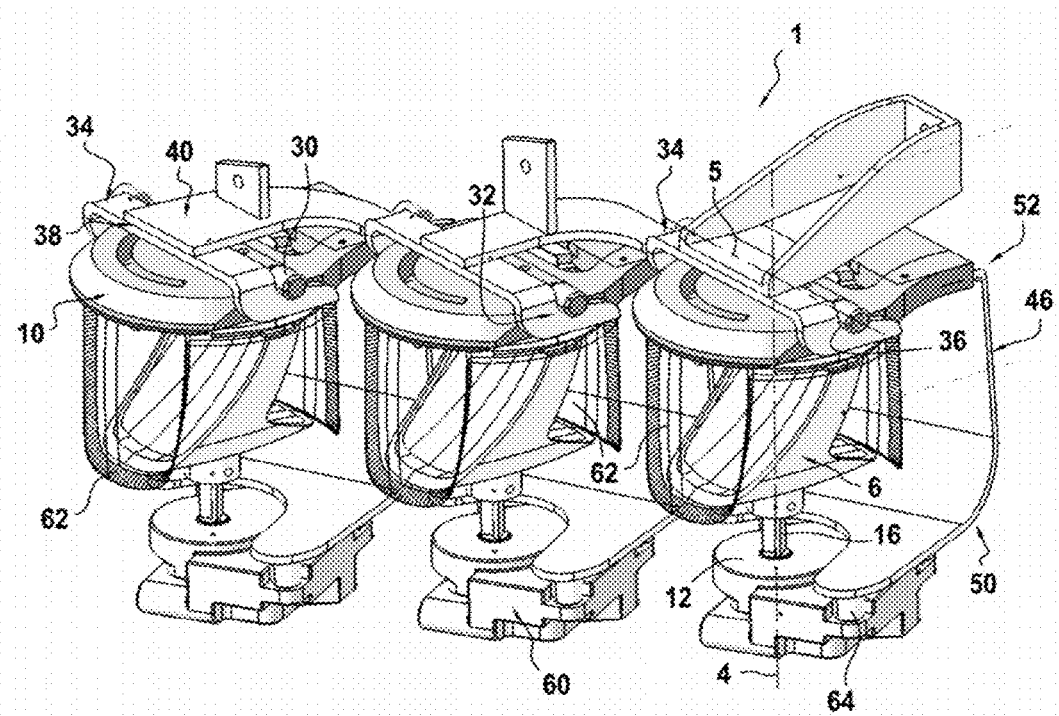
FIG. 3 is a three-quarter perspective profile front view of a lighting and/or signaling device according to a first embodiment, including an assembly of three lighting modules as shown in FIG. 1.

FIG. 3 shows a module with the corresponding first and second axes of rotation. Where each of the lighting modules of a lighting and/or signaling device includes means for generating rotational movement about two axes, it is advantageous in terms of the consistency of the global light beam projected that the first and second axes of rotation belonging to each lighting module be substantially parallel to the first axis of rotation 4 and to the second axis of rotation 5 of neighboring lighting modules 2.

The lighting module 2 according to the invention, as described above, is arranged in a headlamp housing (not shown) of a motor vehicle. A plurality of lighting modules 2 as described above may be arranged together to form a lighting and/or signaling device, and it is advantageous for both headlamps (left and right) to have equivalent assemblies.

The lighting and/or signaling device 1 according to the invention is described below in greater detail with reference to the embodiments in FIGS. 3 to 6, in which the lighting and/or signaling device 1 comprises three lighting modules 2.

According to the invention, each of the three modules of the lighting and/or signaling device 1 are movable in rotation about a first axis of rotation 4 and about the second axis of rotation 5. A single lighting module may have this dual-rotation feature in the lighting and/or signaling device without thereby departing from the context of the invention.

A plate 34 is attached to the housing and designed to correctly position the support 10, and therefore the primary light source 8, of each lighting module 2 in relation to the headlamp of the vehicle (not shown).

Furthermore and as specified above, the plate 34 participates in the formation of the second axis of rotation 5, notably by the arrangement of two coaxial bearings 32 per lighting module, which are either integral with same or made separately and then attached to the plate. Each bearing 32 has a groove 36 into which is inserted the projection 30, which may be a pin or a pad, of the support 10. When the associated actuating means are engaged, the projection is liable to roll in the groove formed in the bearing and to facilitate the rotational guidance of the module about the second axis of rotation 5.

Each lighting module 2 is associated with a plate or a plate portion that overlaps the lighting module, notably the support 10. In a first embodiment of the lighting and/or signaling device according to the invention, illustrated in FIGS. 3 and 4, a plate portion is individually associated with a single lighting module 2 and the three portions respectively associated with each of the modules are rigidly connected together to form a plate 34, and in a second embodiment shown in FIGS. 5 and 6, a trim or mask 34' substantially covers the assembly of the three lighting modules 2 and the associated plate portions.

Figure 4:
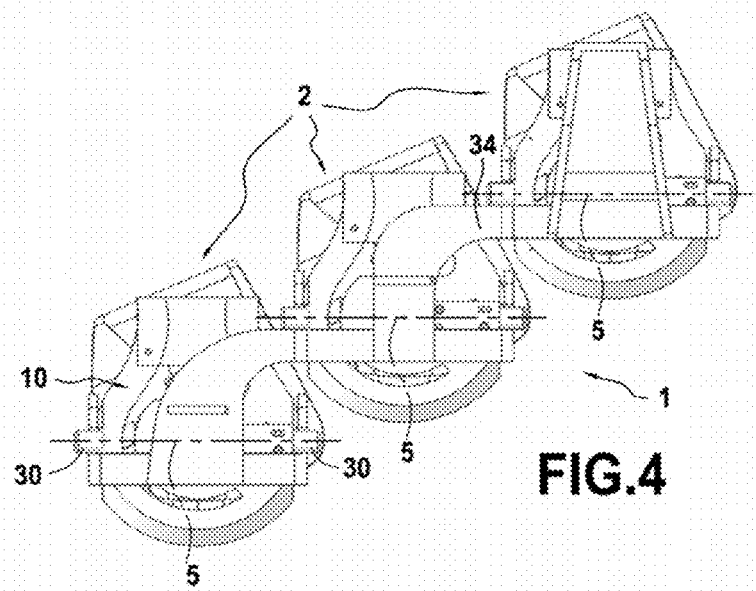
FIG. 4 is a top view of the lighting and/or signaling device in FIG. 3.

In the first embodiment shown in FIGS. 3 and 4, each plate 34 has two portions: a first portion 38 in the form of a bar with bearings 32 at the ends of same, and a second portion 40 perpendicularly extending the first portion substantially at the center of same. For two of the plates 34, the second portion 40 forms an elbow extended as far as one end of the first portion of the neighboring plate, enabling the central portion of the first portion 38 of the plate 34 of a first lighting module 2 to be linked to one end of the first portion of the plate 34 of another neighboring lighting module 2. Naturally, this elbow shape is shown in this case by way of example and may be modified without changing the function.

The specific arrangement of the plate 34 is designed to minimize the space occupied in the housing, while securely holding the lighting modules 2 together and to the housing. Each lighting module 2 may be associated with an individual plate, that is independent of other plates, but the plate is advantageously made as a single part including several bearings respectively associated with one module, such that only one part needs to be attached inside the housing and only one mold needs to be provided, thereby simplifying assembly conditions, saving time and reducing cost.

Figure 5:
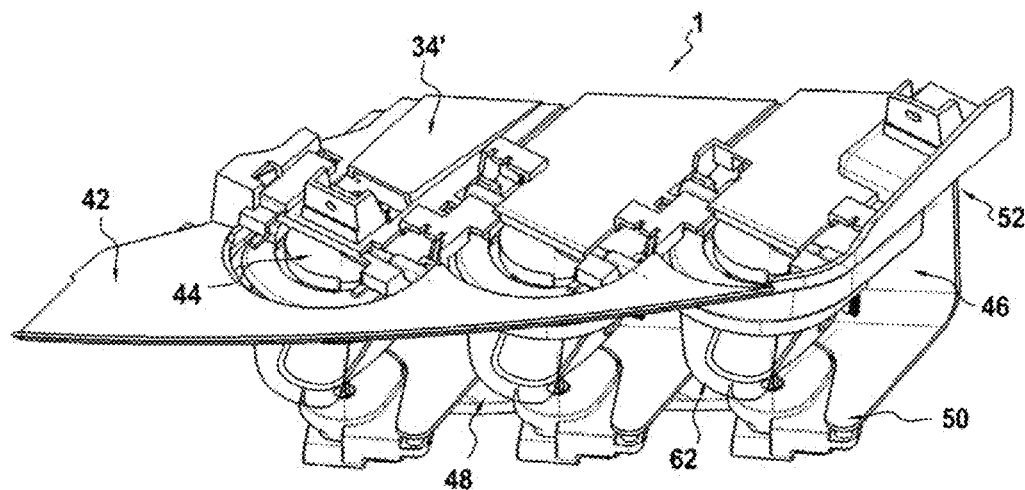
FIG. 5 is a three-quarter perspective front view of the lighting and/or signaling device according to a second embodiment.
Figure 6:
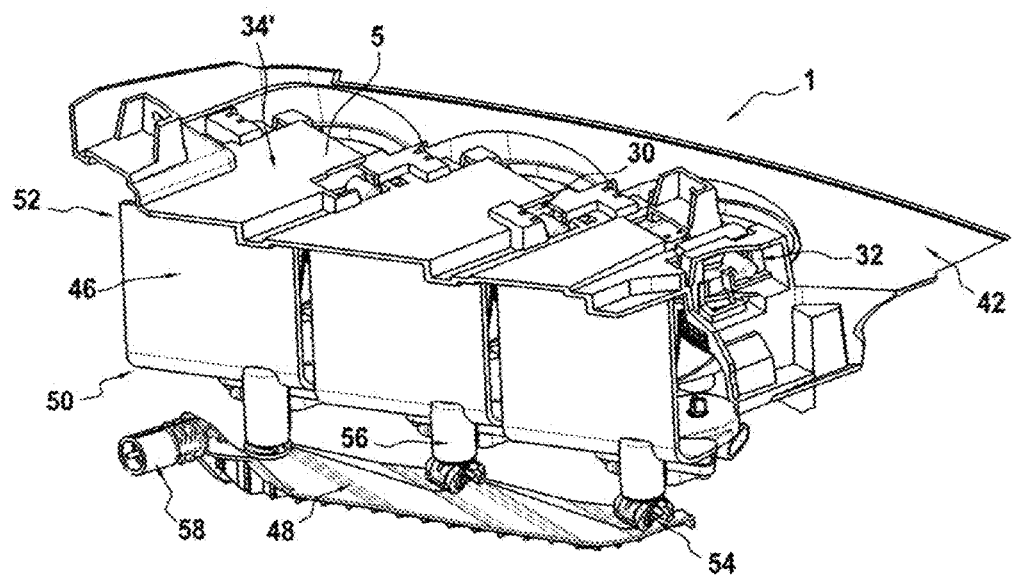
FIG. 6 is a three-quarter perspective rear view of the lighting and/or signaling device in FIG. 5.

In the second embodiment shown in FIGS. 5 and 6, the module includes a trim 34' substantially covering the assembly of the three lighting modules 2 and the associated plate or plates 34. The trim 34' thus forms a fairing, that is notably extended towards the closing outer lens (not shown here) of the housing of the headlamp by the tray 42. The trim 34' includes a plurality of windows 44, respectively provided for each of the modules covered by the plate, the arrangement of which enables the lighting module 2 to rotate freely about the second axis of rotation 5. Where present, such a trim 34' rather than the plate or plates 34, bears the attachment means to the housing.

Furthermore, each lighting module is associated with a connecting rod 46, in this case in the form of a square plate, that comprises a supporting part for the support 10 and a transmission part for a movement of an actuation element 48 (shown in particular in FIG. 6) causing the module to pivot about the second axis of rotation 5. For this purpose, the connecting rod 46 is linked at a first free end 50 with the actuation element 48 and is rigidly connected to the support 10 at the second opposing free end 52 of same.

The actuation element 48, as shown in FIGS. 5 and 6, is a plate extending beneath the assembly of the three lighting modules 2. Said plate carries three male click elements 54 designed to cooperate with the female click elements 56 carried by each of the square connecting rods 46. The attachment means between the actuation element 48 and the square connecting rods 46 need not be click elements, provided that they enable the transmission of the movement from one to the other.

The actuation element 48 is made movable under the effect of a rod (not shown here) rigidly connected to a sleeve 58 arranged between of the actuation element. The motorized movement of the rod generates a translational movement of the actuation element and a corresponding thrust on each of the connecting rods 46 linked to the actuation element.

The fact that the projections 30, rigidly connected to the square connecting rods at the opposite end, butt against the groove 36 of the bearings 32 generates a rotational effect about an axis substantially defined by the contact lines between the projections and the bearings. The module continues to pivot until the thrust from the actuation element 48 ceases. Since the upper portion of the square connecting rod 46 is connected to the support 10 of the light source 8, this support follows the rotational movement, whereas, at the opposite end, said rotational movement of the square connecting rod 46 is followed by an attachment base 60 of the actuator 12, which is rigidly connected to said connecting rod. This results in a rotational movement of the optical deviation elements 6, which are driven by the support 10, via the upper rotational guide elements 14, and by the actuator block 12, such that the position of the optical deviation elements in relation to the main light source in particular remains reliable throughout the rotation about the second axis 5.

The square connecting rod 46 is designed to enable the free rotation and passing of the optical deviation elements 6 about the first axis of rotation 4.

As shown in FIGS. 3 and 5, the lighting module 2 according to the invention may include a transparent screen 62 placed on the output path of the light beam from the lighting module 2. This screen 62 is arranged to receive the rays emitted by the additional light source or sources 25. The screen is thus intended to produce a style effect when the additional light sources are turned on, without hindering the formation of a regulation-compliant beam when the main light source 8 is turned on. The screen 62 in this case only performs an additional function and the lighting module need not include such a screen facing the optical deviation elements 6, as illustrated in FIGS. 1 and 2.

The lighting module 2 also includes a control device designed to formulate command instructions using information received from vehicle state sensors, said instructions being sent to the actuator 12 and to the actuation means (not shown) used for the rotational movement about the second axis of rotation. The instructions involve determining the angular position of the lighting module 2 about the first axis of rotation 4 and/or about the second axis of rotation 5.

The lighting function can thus be made directional, using the actuator 12 and the actuation means related to the rotational movement about the second axis of rotation 5 of the lighting module 2. The rotational movements about the first axis of rotation 4 and about the second axis of rotation 5 may be simultaneous and calibrated between the two axes, or entirely independent.

Simultaneous rotation is notably possible since the actuator 12 is driven in rotation with the lighting module 2 when the latter is driven in rotation about the second axis of rotation 5. When the lighting module 2 is driven in rotation about the second axis of rotation 5, the rotation about the first axis of rotation 4 is made possible notably by an arrangement provided for this purpose.

The rotation about each of these axes of rotation may be complete or partial. More specifically, in the example illustrated, the rotation about the first axis of rotation may be equal to 360°, while the angle of rotation about the second axis of rotation is equal to a few degrees, notably for reasons relating to size and functional requirements of the corresponding lights.

The maximum rotation of the lighting module 2 about the first axis of rotation 4 is a rotation of the optical deviation elements 6 between a first position in which the reflective face 20 is in an active position, i.e. turned towards the front of the vehicle, and a second position in which an aspect face on the back of the reflective face is active, for example to perform a signaling function when starting the vehicle.

The partial rotation of the lighting module 2 about the first axis of rotation 4 is a rotation of a few degrees of the optical deviation elements 6, and is notably used when the reflective face 20 is in the active position and the main lighting source 8, which remains static, is emitting rays towards this reflective face 20. This enables a dynamic bending light (DBL) directional lighting function to be provided using the actuator 12 of the lighting module, which commands a rotation of the optical deviation elements 6 of between one and several degrees about the first axis of rotation 4.

The partial rotation of the lighting module 2 about the second axis of rotation 5 is a rotation of between one and several degrees of the optical deviation elements 6, and is notably used when the optical deviation elements 6 are in the active position and the main lighting source 8 is emitting rays towards these optical deviation elements 6, in order notably to offset the light beam formed at the output of the lighting module 2 by several degrees in relation to the horizon. Maximum rotation is the rotation permitted by the size of the headlamp.

The lighting function can thus be made directional, using the actuator 12 and the actuation means related to the rotational movement about the second axis of rotation 5 of the lighting module 2. The rotation of the lighting module 2 can therefore be commanded about the first axis of rotation 4 and/or the second axis of rotation 5, the rotational movements about these two axes of rotation being simultaneous or entirely independent. The simultaneous rotation about the two axes of rotation is possible since the actuator 12 is driven in rotation with the lighting module 2 when the latter is driven in rotation about the second axis of rotation 5.

Operation of the lighting and/or signaling device is described below, notably a first embodiment in which the light beam outputted from the lighting module 2 is diverted transversely, and a second embodiment in which the light beam is deviated vertically at the output of the lighting module. These two operating modes can operate simultaneously or alternately.

The first operating mode involves the actuator 12 transmitting a rotational movement to the output shaft 16, said output shaft 16 driving the optical deviation elements 6 in rotation about the first axis of rotation 4, the rotation being guided along a path defined by the arrangement of the rotational guide elements 14. The optical deviation elements 6 turn about the first axis of rotation 4 by an angle defined by the command instructions sent to the actuator, while the support 10 and the light sources carried by same remain static. The square connecting rod 46 forms the link between the support 10 of the lighting source and the actuator 12, and is firstly rigidly connected to the support 10 at a first end and secondly rigidly connected to the attachment base 60 of the actuator using attachment means 64, in this case a threaded shaft arranged between the square connecting rod and the base 60 and traversed by a clamping screw (not shown) that attaches the connecting rod to the attachment base of the actuator. Notably, the light source 8 is centered with the focus of the optical deviation elements 6 in advance. The rays are then deviated at the output of the lighting module 2 as a function of the degree of rotation commanded and subsequently effected by the actuator 12 the light beam outputted can perform a transverse movement.

The second operating mode involves the actuation means 48 (shown in FIG. 4) being able to push the bottom of the connecting rod 46 using the click elements. This thrust on the square connecting rod 46 causes a pivoting of the module assembly about the second axis of rotation 5. The projections 30 from the lateral face 15 of the support 10 turn in the static bearings carried by the plate. The bottom of the square connecting rod pivots, driving the attachment base of the actuator 12, the actuator 12, the output shaft 16, the optical deviation elements 6, the rotational guide elements 14 and the different portions of the support 10 when rotating about the second axis 5. When the square connecting rod pivots, the support 10 is also driven in rotation about the second axis of rotation, which drives the rotational guide elements 14, then the optical deviation elements and the actuator in the same rotational direction. All of these components are thus taken as a single assembly constrained to rotate about the second axis of rotation 5 to effect a vertical movement of the light beam outputted from the lighting module 2.

The lighting module according to the invention, as described above, is arranged in a headlamp housing (not shown) of a motor vehicle. It is advantageous for the two headlamps (left and right) to have equivalent assemblies. A plurality of lighting modules as described above may be arranged together to form a lighting and/or signaling device.

Depending on the lighting command instructions for the light sources and the rotation command instructions for the lighting module, the invention enables different combinations of functions to be provided and the lighting zone to be enlarged. Transverse pivoting of at least one lighting module enables lighting to the left or to the right of the vehicle while vertical pivoting of at least one lighting module enables upward or downward lighting, depending on the conditions detected on the road.

For this purpose, the device may include means for detecting driving conditions, and means for processing an operating command instruction for the lighting module or modules as a function of the information sent by said detection means. These command instructions enable the horizontal and/or vertical rotational movement of at least one module, so as to direct the light beam generated by and outputted from the lighting module.

The description above clearly describes how the invention enables the stated objectives to be achieved, and in particular different combinations of functions to be provided and the lighting zone to be expanded. Depending on the lighting command instructions for the light sources and the rotation command instructions for the lighting modules, the invention enables one or more lighting modules 2 to be rotated about the first axis of rotation 4 and/or the second axis of rotation 5, so as to enable the transverse movement and/or vertical movement of the light beam outputted from the lighting module, the addition of each light beam outputted from the lighting module forming a global light beam enabling a large lighting and/or signaling zone, while observing the size restrictions of the lighting and/or signaling device.

The invention claimed is:

1. A lighting module for a motor vehicle comprising:
   a light source designed to emit light rays;
   optical deviation elements mounted movably in rotation about a first axis of rotation and arranged so as to deviate said light rays to form a light beam, the optical deviation elements including a reflector with a reflective face, a lower end of the optical deviation elements connected to an output shaft and an upper end of the optical deviation elements including rotational guide elements;
   a support which carries the light source and a portion of the rotational guide elements for the optical deviation elements about the first axis of rotation, the support including a circular upper face, a lower face, and a peripheral face connecting the upper and lower faces; and
   an actuator designed to rotate the output shaft so as to rotate the optical deviation elements about the first axis of rotation,
   wherein said module is movable in rotation about a second axis of rotation which is substantially perpendicular to the first axis of rotation,
   wherein the second axis of rotation is defined at least partially by two projections projecting from the peripheral face of the support, the two projections designed to cooperate with bearings,
   wherein the light source is substantially aligned with the first axis of rotation, and wherein the first axis of rotation passes through the support, the optical deviation elements, and the actuator.

2. The lighting module according to claim 1, wherein the reflector is substantially elliptical, the light source being arranged substantially in a vicinity of a first focus of said reflector.

3. The lighting module according to claim 1, wherein the lighting module is associated with a connecting rod, which is rigidly connected at a first end to the actuator and at a second end to the support carrying the light source and overlapping the optical deviation elements.

4. The lighting module according to claim 3, wherein the lighting module is rotated about the second axis of rotation by an actuation element designed to push the connecting rod.

5. The lighting module according to claim 4, wherein the actuation element is designed to push on the first end of the connecting rod.

6. The lighting module according to claim 4, wherein the actuation element includes a board carrying attachment means that are designed to cooperate with attachment means carried on the connecting rod.

7. A lighting device including at least one lighting module according to claim 1.

8. The lighting device according to claim 7, wherein the lighting module includes a housing and a closing outer lens delimiting a seat for the at least one lighting module.

9. The lighting device according to claim 8, wherein the at least one lighting module is associated with at least one plate rigidly connected to the housing and carrying bearings used to define the second axis of rotation.

10. The lighting device according to claim 9, wherein the lighting module includes an assembly of at least two of said lighting modules, each being involved in forming a primary light beam, an aggregation of the primary light beams forming a global light beam at an output of the device.

11. The lighting device according to claim 10, wherein said second axis of rotation is specific to each lighting module.

12. The lighting device according to claim 7, wherein the lighting module includes an assembly of at least two of said lighting modules each being involved in forming a primary light beam, an aggregation of the primary light beams forming a global light beam at an output of the device.

13. The lighting device according to claim 7, wherein said second axis of rotation is specific to each lighting module.

14. The lighting module according to claim 1, wherein the first axis of rotation extends in a vertical direction.

* * * * *